US010104825B2

(12) United States Patent
Blunier et al.

(10) Patent No.: US 10,104,825 B2
(45) Date of Patent: Oct. 23, 2018

(54) PULL FRAME FOR AN AGRICULTURAL IMPLEMENT

(75) Inventors: Timothy R. Blunier, Danvers, IL (US); Brian McMahon, Deer Creek, IL (US); Matthew R. Sudbrink, Metamora, IL (US)

(73) Assignee: CNH Industrial America LLC, New Holland, PA (US)

( * ) Notice: Subject to any disclaimer, the term of this patent is extended or adjusted under 35 U.S.C. 154(b) by 474 days.

(21) Appl. No.: 13/605,209

(22) Filed: Sep. 6, 2012

(65) Prior Publication Data

US 2014/0060403 A1  Mar. 6, 2014

(51) Int. Cl.
| | |
|---|---|
| *A01B 59/042* | (2006.01) |
| *A01B 59/00* | (2006.01) |
| *A01C 7/20* | (2006.01) |
| *B60D 1/62* | (2006.01) |
| *B60D 1/145* | (2006.01) |
| *A01B 59/048* | (2006.01) |
| *A01C 23/00* | (2006.01) |
| *A01B 63/111* | (2006.01) |
| *A01B 73/04* | (2006.01) |

(52) U.S. Cl.
CPC .......... *A01B 59/042* (2013.01); *A01B 59/002* (2013.01); *A01B 59/048* (2013.01); *A01C 7/208* (2013.01); *A01C 23/008* (2013.01); *B60D 1/145* (2013.01); *B60D 1/62* (2013.01); *A01B 63/111* (2013.01); *A01B 73/04* (2013.01); *Y10T 29/49826* (2015.01)

(58) Field of Classification Search
CPC ..... A01B 59/042; A01B 59/002; A01C 7/208; B60D 1/145; B60D 1/62

USPC .............. 701/50; 172/311; 56/218; 239/722; 111/52

See application file for complete search history.

(56) References Cited

U.S. PATENT DOCUMENTS

| | | | | |
|---|---|---|---|---|
| 3,168,940 | A * | 2/1965 | Ross et al. ................ | 188/112 R |
| 3,527,315 | A * | 9/1970 | Hampton ..................... | 180/238 |
| 4,009,554 | A * | 3/1977 | Adee ................................. | 56/1 |
| 4,030,551 | A * | 6/1977 | Boetto et al. ................. | 172/126 |
| 4,116,138 | A * | 9/1978 | McFarland et al. .......... | 111/120 |
| 4,572,087 | A * | 2/1986 | Brannan ......................... | 111/56 |
| 4,679,634 | A   | 7/1987 | Bulmahn | |
| 4,738,461 | A * | 4/1988 | Stephenson et al. .......... | 280/400 |
| 5,082,217 | A   | 1/1992 | Parker et al. | |
| 6,168,182 | B1  | 1/2001 | Ford | |
| 6,378,279 | B1* | 4/2002 | Smith et al. ................... | 56/15.5 |
| 6,585,057 | B1* | 7/2003 | Hainsworth ................... | 172/677 |
| 7,025,008 | B2  | 4/2006 | Fischer | |

(Continued)

*Primary Examiner* — Alicia Torres
(74) *Attorney, Agent, or Firm* — Rebecca L. Henkel; Rickard K. DeMille

(57) ABSTRACT

An agricultural implement includes a tool bar assembly configured to couple to a main frame of the agricultural implement and a pull frame. The tool bar assembly includes a first tool with a height that is adjustable relative to a soil surface. The pull frame includes a hitch assembly configured to be coupled to a work vehicle, a mounting portion configured to be removably coupled to the main frame of the agricultural implement, and a hollow portion that extends over the first tool bar between the hitch assembly and the mounting portion while the tool bar assembly and the pull frame are coupled to the main frame. The hollow portion is configured to accommodate one or more conduits.

20 Claims, 4 Drawing Sheets

(56) References Cited

U.S. PATENT DOCUMENTS

| | | |
|---|---|---|
| 7,150,419 B1 * | 12/2006 | Tomlonovic et al. ........ 239/722 |
| 7,243,593 B2 | 7/2007 | Westendorf et al. |
| 7,540,133 B2 | 6/2009 | Zacharias et al. |
| 8,096,571 B1 | 1/2012 | Noe |
| 8,469,386 B2 * | 6/2013 | Clark et al. ................... 280/494 |
| 2013/0020138 A1 * | 1/2013 | Fegley et al. ................ 180/14.3 |

* cited by examiner

PULL FRAME FOR AN AGRICULTURAL IMPLEMENT

BACKGROUND

The invention relates generally to ground working equipment, such as agricultural equipment, and more specifically, to a pull frame for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of injection nozzles, to flow the liquid fertilizer into respective trenches formed by the openers and the knives. Using such implements, fertilizer may be distributed throughout a field, either before or after planting, to facilitate enhanced crop development.

A fertilizer application implement may include a storage tank on a frame to house a flowable agricultural product for distribution throughout the field. A fertilizer application implement may also include actuating cylinders configured to adjust a height of the tool frame and/or to transition the tool frame between transport and working configurations. Hydraulic lines from the tractor or other work vehicle may be coupled to the hydraulic cylinders. Typically, the hydraulic lines are fastened to the tool frame at various points. Unfortunately, in certain configurations, the hydraulic lines may interfere with and/or contact moving parts of the fertilizer application implement, thereby wearing the hydraulic lines and/or limiting the range of motion of the moving parts. Moreover, the pull frame may interfere with the moving parts of the fertilizer application implement, thereby further limiting the range of motion of the moving parts.

BRIEF DESCRIPTION

In one embodiment, an agricultural implement includes a tool bar assembly configured to couple to a main frame of the agricultural implement and a pull frame. The tool bar assembly includes a first tool with a height that is adjustable relative to a soil surface. The pull frame includes a hitch assembly configured to be coupled to a work vehicle, a mounting portion configured to be removably coupled to the main frame of the agricultural implement, and a hollow portion that extends over the first tool bar between the hitch assembly and the mounting portion while the tool bar assembly and the pull frame are coupled to the main frame. The hollow portion is configured to accommodate one or more conduits.

In another embodiment, an agricultural embodiment includes a main frame, a tool bar assembly, and a pull frame. The main frame is configured to at least partially support the agricultural implement. The tool bar assembly is removably coupled to the main frame and includes a plurality of tool bars that is vertically adjustable relative to a soil surface. The pull frame includes a hitch assembly configured to be coupled to a work vehicle, a mounting portion removably coupled to the main frame, and a hollow portion that extends over at least one tool bar of the plurality of tool bars between the hitch assembly and the mounting portion. The hollow portion is also configured to accommodate one or more conduits. The hollow portion is positioned to be spaced from the plurality of tool bars throughout a folding range of motion of the tool bar assembly.

In a further embodiment, a method of manufacturing an agricultural implement includes coupling a first tool bar assembly to a main frame. A first height of the first tool bar assembly is adjustable relative to a soil surface. The method also includes selecting a first pull frame based a range of motion of the first tool bar assembly. The method further includes removably coupling the first pull frame to the main frame. The first pull frame extends over at least a portion of the first tool bar assembly.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
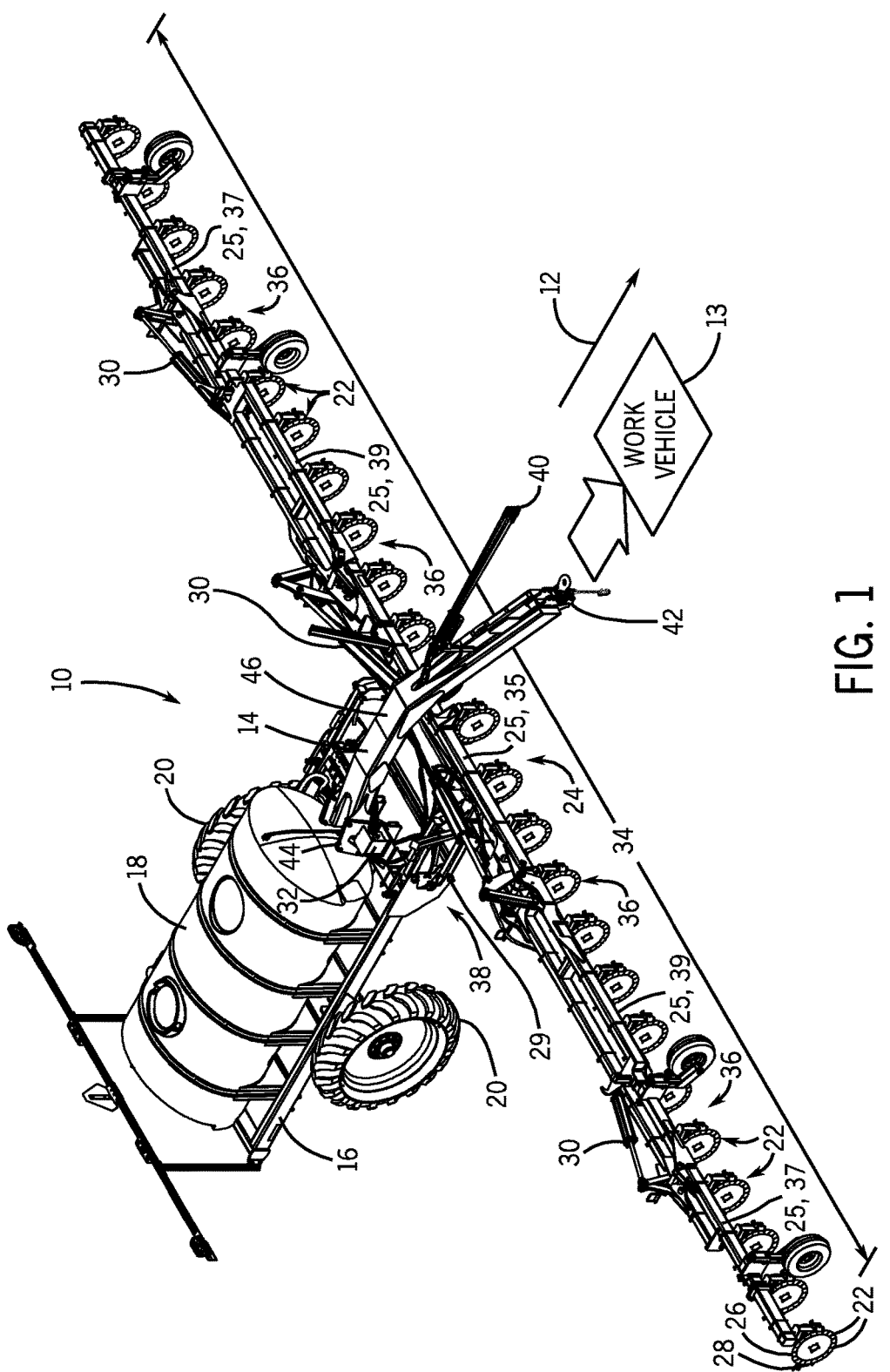
FIG. 1 is a perspective view of an embodiment of an agricultural implement having a pull frame mounted over a tool bar assembly.

FIG. 1 is a perspective view of an embodiment of an agricultural implement 10 having a pull frame mounted over a tool bar assembly. In the illustrated embodiment, the implement 10 is configured to be towed along a direction of travel 12 by a work vehicle 13, such as a tractor or other prime mover. The work vehicle 13 may be coupled to the implement 10 by a pull frame 14, such as the illustrated "goose neck" pull frame. As illustrated, the pull frame 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24. Each row unit 22 includes a ground engaging tool 26 configured to break the soil, thereby excavating a trench into the soil. An injection nozzle 28 or knife (e.g., positioned behind the ground engaging tool) is configured to deposit flowable agricultural product from the storage tank 18 into the trench formed by the ground engaging tool 26. In certain embodiments, the penetration depth of the ground engaging tools 26 is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., at the approximate midpoint between rows, thereby facilitating enhanced crop development. In addition, the implement 10 may be utilized to apply fertilizer to previously planted seeds (e.g., via injecting fertilizer between rows of the previously planted seeds).

The tool bar assembly 24 is divided into tool bars 25, with each tool bar 25 including one or more row units 22. The tool bar assembly 24 includes main actuators 29 to adjust the height of at least one of the tool bars 25, and respective row units 22, of the tool bar assembly 24 relative to the soil surface, and to adjust the force applied to the ground engaging tools 26. In the present embodiment, an actuator controller 32 is configured to control the main actuators 29 and folding actuators 30. In some embodiments, the actuator controller 32 (e.g., hydraulic controller) is configured to control the folding actuators 30 to rotate (e.g., fold) the tool bars 25 to adjust a span 34 of the implement 10. The main actuators 29 and folding actuators 30 may use hydraulic cylinders, pneumatic cylinders, and/or electric motors. The implement 10 is shown in FIG. 1 in a working configuration. Adjusting the span 34 may also adjust the number of rows to be fertilized. In some embodiments, the span 34 of the implement 10 with the tool bars 25 fully extended may be greater than, or equal to, approximately 30 feet, 45 feet, 60 feet, or 75 feet. The folding actuators 30 may fold the tool bar assembly 24 to a transport configuration by folding some of the tool bars 25 about joints 36 between tool bars 25. The pull frame 14 extends over a central tool bar 35. In some embodiments, folding actuators 30 may fold outer wing tool bars 37 at joints 36 over inner wing tool bars 39, and folding actuators may fold inner wing tool bars 39 over the central tool bar 35. The folded tool bars 25 may at least partially surround the pull frame 14. The span 34 of the implement 10 when the tool bars 25 are folded about the joints 36 may be less than, or equal to, approximately 6 feet, 10 feet, or 15 feet.

The pull frame 14 extends over the tool bar assembly 24 and removably mounts to a front end 38 of the main frame 16. In some embodiments, conduits 40 pass through at least part of the pull frame 14. The conduits 40 may transfer any suitable conveyable item between the work vehicle 13 and the implement 10. For example, the conduits 40 may transfer hydraulic fluid for hydraulic cylinders, compressed air for pneumatic cylinders, electric current for electric motors and/or electronic components of the implement 10, supply lines for fertilizer, or combinations thereof. The conduits 40 may pass over at least part of the tool bar assembly 24 and be enclosed within the pull frame 14.

The pull frame 14 is removably coupled to the work vehicle 13 via a hitch assembly 42, and removably coupled to the main frame 16 via a mounting portion 44. The conduits 40 are configured to pass through a hollow portion 46 of the pull frame 14. The hollow portion 46 is configured to accommodate the conduits 40, and to substantially enclose and protect the conduits 40 from interfering (e.g., contacting, snagging) with moving parts of the tool bar assembly 24, such as the ground engaging tools 26, the injection nozzles 28, and so forth. In some embodiments, the conduits 40 are fully enclosed within the hollow portion 46. The main frame 16 may be removably coupled to pull frames 14 having different geometries. The geometries of some pull frames 14 may accommodate a large turning radius and/or a wide span 34. The geometries of some pull frames 14 may accommodate large adjustable height range of the central tool bar 35 and/or accommodate a particular shape of the central tool bar 35. A replaceable pull frame 14 enables a variety of tool bar assemblies 24 to be used. The replaceable pull frame 14 may be removed independently of the tool bar assembly 24. Various pull frames 14 may be removably coupled to the main frame 16 to reduce the interference of the tool bar assemblies 24 with the pull frame 14. Pull frames 14 having different geometries may enable the main frame 16 to couple with substantially any tool bar assembly 24 and work vehicle 13 without limiting operational aspects of the implement 10.

Figure 2:
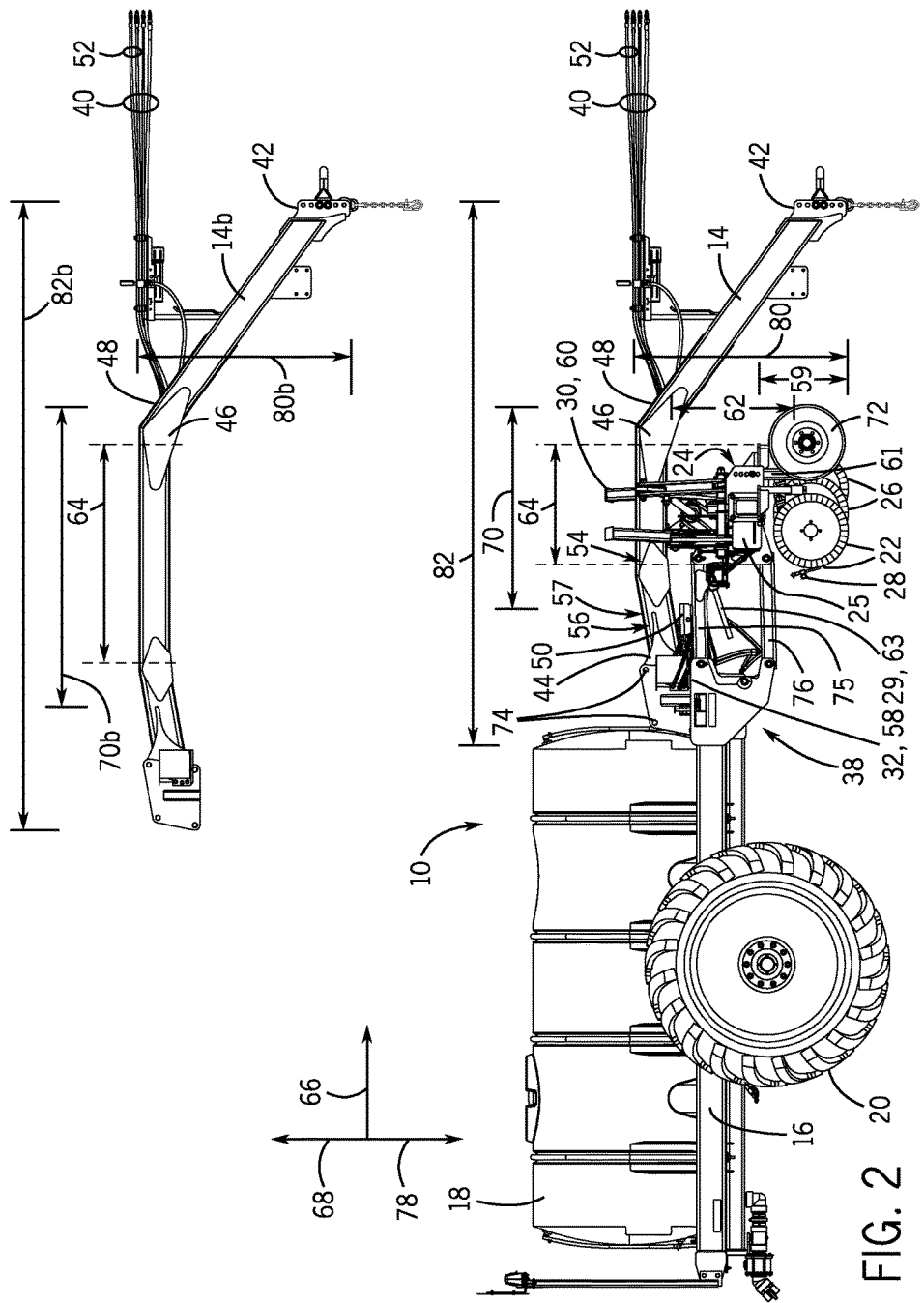
FIG. 2 is a side view of the agricultural implement of FIG. 1.

FIG. 2 is a side view of the agricultural implement 10 of FIG. 1. As discussed above, the conduits 40 may pass through the hollow portion 46 of the pull frame 14. The conduits 40 may enter the hollow portion 46 through a first port 48 proximate to the hitch assembly 42 of the pull frame 14, and exit the hollow portion 46 through a second port 50 proximate to the mounting portion 44. The conduits 40 may include hoses or pipes configured to convey fluids (e.g., hydraulic fluid, compressed air, fertilizer), or electrical lines configured to transmit electrical power and/or signals between the work vehicle 13 and the implement 10. The conduits 40 may be inserted through the first port 48 and the second port 50 individually or as one or more bundles. The hollow portion 46 may be partitioned for each conduit 40 and/or the hollow portion 46 may have separate second ports 50 for different conduits 40. For example, the hydraulic conduits 52 may be configured to exit through a second port 50 on a bottom portion 54 of the pull frame 14, and other conduits 40 may be configured to exit through the second port 50 on a side portion 56 and/or a top portion 57 of the pull frame 14. In some embodiments, the hollow portion 46 is configured to guide and retain the conduits 40 between the first port 48 and the second port 50 without fastening the conduits 40 to the pull frame 14 or to the tool bar assembly 24. This configuration may enable the pull frame 14 and conduits 40 to be changed or replaced more quickly than traditional pull frames that have conduits 40 bolted to the implement 10. The hollow portion 46 may enable the conduits 40 to move and flex while protecting the conduits 40 from interference with moving parts (e.g., row units 22) of the tool bar assembly 24.

Some of the conduits 40 may supply a fluid to the actuator controller 32 (e.g., hydraulic controller 58) for driving the actuators 29, 30 (e.g., hydraulic cylinders 63, 60). While the discussion below refers to a hydraulic control system with the hydraulic controller 58 and the hydraulic cylinders 60 with hydraulic fluid supplied through the hydraulic conduits 52, the actuators 29, 30 and the actuator controller 32 may be a pneumatic or electric control system supplied by pneumatic or electrical conduits. The hydraulic controller 58 may drive the hydraulic cylinders 60 to fold the tool bars 25 for various reasons, such as to reduce the number of operational row units 22, to narrow the span 34 for transport or storage, or to provide access to components of the tool bar assembly 24 for maintenance, and so forth. The hydraulic controller 58 may adjust a height 59 of the tool bar assembly 24 relative to the soil surface throughout a height range of motion 62 by driving the hydraulic cylinders 63. In some embodiments, the hydraulic cylinders 60 are configured to adjust a position of the wing tool bars 37, 39 relative to the central tool bar 35 so that the wing tool bars 37, 39 substantially fold through a folding range of motion around at least a portion of the tool bar assembly 24 and the pull frame 14. The hollow portion 46 of the pull frame 14 may be positioned over the central tool bar 35 at a distance sufficient to accommodate the height range of motion 62, and the hollow portion 46 may be spaced from the wing tool bars 37, 39 throughout the folding range of motion. The tool bar assembly 24 has a first length 64 in a longitudinal direction 66 that may be less than a second length 70 of the hollow portion 46 of the pull frame 14. The hollow portion 46 of the pull frame 14 substantially isolates the conduits 40 from the row units 22 and wheels 72 that may be proximate to the pull frame 14 when in the folded configuration.

The pull frame 14 may be removably coupled to the main frame 16 to enable the pull frame 14 to be removed and replaced with another pull frame 14 having a different geometry. Some pull frames 14 may accommodate different height ranges of motion 62, and/or provide different spacing from the wing tool bars 37, 39 throughout the folding range of motion. In some embodiments, the mounting portion 44 is coupled to the main frame 16 with bolts 74 or other fasteners. In some embodiments, the pull frame 14 is rotatably coupled to the main frame 16 to accommodate variations in the height of the front portion 38 of the main frame 16. For example, contact between the ground engaging tools 26 and the soil surface may drive the front end 38 of the main frame upwardly in the vertical direction 68. The tool bar assembly 24 may be removably coupled to the main frame 16 by tool bar supports 76 that are separate from the pull frame 14. The tool bar supports 76 may accommodate adjusting the tool bar assembly 24 throughout the tool bar height range of motion 62. Coupling the pull frame 14 to the main frame 16 enables the pull frame 14 to be adjusted independently of the tool bar assembly 24, such as to raise or lower the hitch assembly 42 in a vertical direction 68. The hydraulic controller 58 may be configured to adjust the penetration depth of the ground engaging tools 26 independently of the pull frame 14 via controlling the hydraulic cylinders 61 coupled to the wheels 72. The hydraulic cylinders 63 coupled to the tool bar supports 76 may adjust the force applied to the central tool bar 35 in the vertically downward direction 78. The hydraulic cylinders 63 may raise the tool bar assembly 24 to enable the implement 10 to readily turn, such as at headlands, etc. Removably coupling both the pull frame 14 and the tool bar assembly 24 to the main frame 16 enables the pull frame 14 and tool bar assembly 24 to be readily adjusted, replaced, and/or maintained independently.

Different geometries of the pull frame 14 may be used to accommodate various tool bar assemblies 24 and folded configurations. Tool bar assemblies 24 may have different geometries for reasons including, but not limited to, the size of the work vehicle 13, the configuration of the storage tank 18, a desired size of the folded configuration, the type and consistency of the flowable agricultural product (e.g., anhydrous ammonia, urea, etc.), and the landscape of the field. The mounting portion 44 and the hollow portion 46 of the illustrated pull frame 14 extends substantially horizontally along the longitudinal direction 66, with the hitch assembly 42 extending vertically downward in the direction 78, generally forming a J-shape (e.g., goose neck). In some embodiments, the hollow portion 46 extends substantially horizontally over part of the tool bar assembly 24, whereas the mounting portion 44 and hitch assembly 42 extend vertically downward 78 forming a C-shape. In other embodiments, the pull frame 14 may have an S-shape or an L-shape configured to pass over the central tool bar 35 without interfering with the folded tool bars 25 and the row units 22 of the tool bar assembly 24. The hollow portion 46 may be spaced a distance from the tool bar assembly 24 substantially along the length 70 of the hollow portion 46. A pull frame height 80 and a third length 82 of the pull frame 14 may vary between pull frames 14 based at least in part on the geometry of the main frame 16 and/or the tool bar assembly 24. For example, a pull frame 14b with a longer second length 70b, a greater height 80b, and/or a longer third length 82b may be removably coupled to the main frame 16 to accommodate a longer first length 64 of a tool bar assembly 24.

Figure 3:
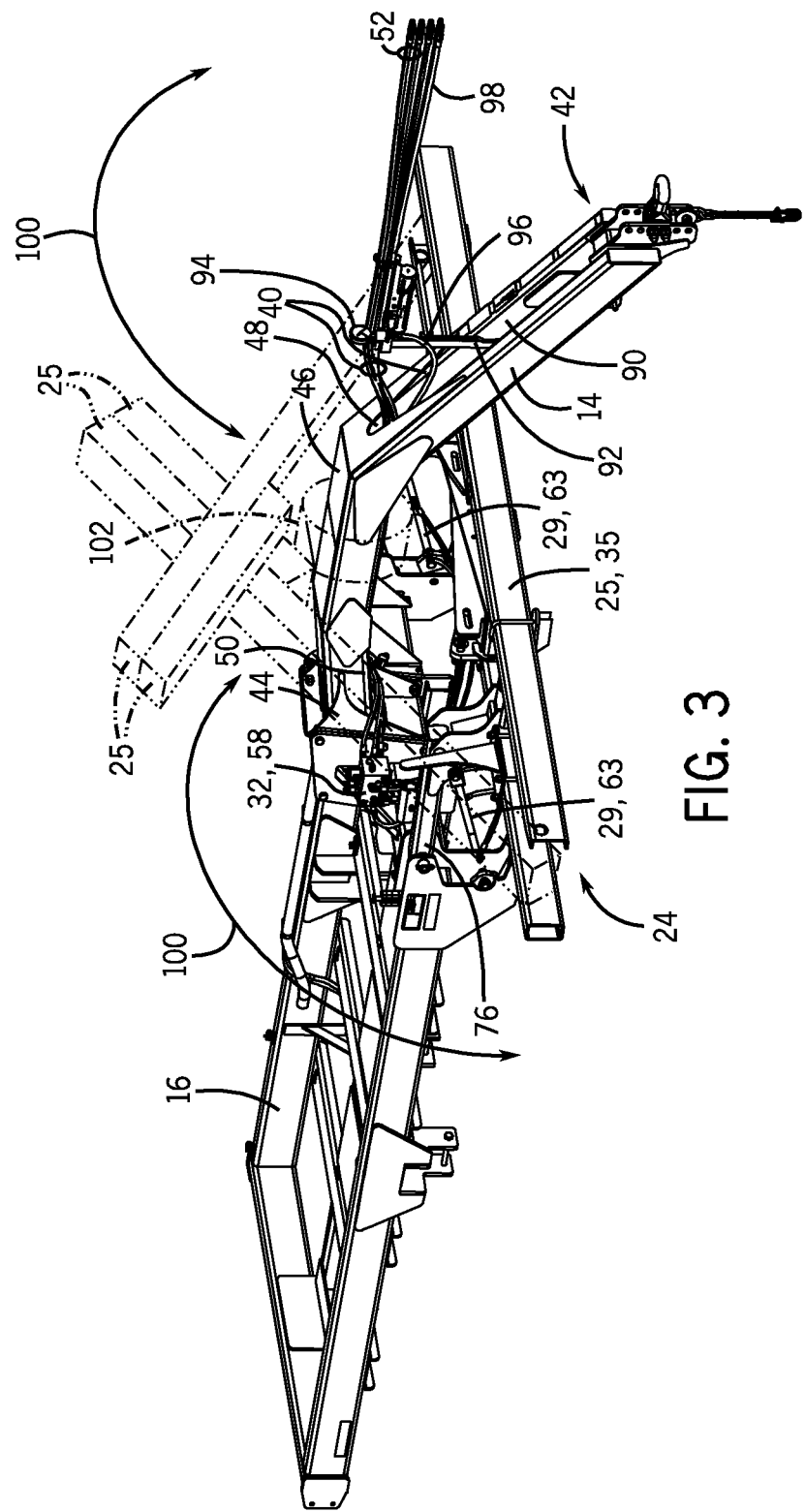
FIG. 3 is a perspective view of an embodiment of a pull frame mounted to a main frame of the agricultural implement of FIG. 1.

FIG. 3 is a perspective view of an embodiment of the pull frame 14 mounted to the main frame 16 of the agricultural implement 10 of FIG. 1. Only the pull frame 14, the main frame 16, and the central tool bar 35, the tool bar supports 76, and tool bars 25 are shown here for clarity. The first port 48 proximate to the hitch assembly 42 is configured to receive the one or more conduits 40 through the hollow portion 46, which directs the conduits 40 to the second port 50 proximate to the mounting portion 44. The hitch assembly 42 may have a channel 90 configured to direct and/or support the conduits 40 before the conduits 40 enter the first port 48. As illustrated, a conduit support 92 is configured to support the conduits 40 over the hitch assembly 42 to reduce interference between the conduits 40 and hitch assembly 42, to guide the conduits through the first port 48, to bundle the conduits 40, and/or to support measurement devices (e.g., sensors, gauges). For example, a fertilizer conduit 96 may be coupled to a pressure gauge 94 configured to indicate the pressure of the liquid fertilizer in the tank 18. The pressure gauge 94 may enable an operator to readily determine the pressure of the liquid fertilizer as it is applied to the field. In some embodiments, electrical lines 98 may electrically couple components of the implement 10 to the work vehicle 13. For example, the electrical lines 98 may provide electrical power to the actuator controller 32, flow controller, fertilizer pump, lights, sensors, and so forth. The electrical lines 98 may also be configured to transmit electrical signals between components of the implement 10 and the work vehicle 13.

The pull frame 14 extends over the central tool bar 35 by a distance sufficient to accommodate a height range of motion 62 of the central tool bar 35. As discussed above, the hydraulic controller 58 may drive hydraulic cylinders 63 to adjust the height of the tool bar assembly 24 and/or to drive the hydraulic cylinder 60 to fold the tool bar assembly 24 at least partially about the pull frame 14. The tool bars 25 of the tool bar assembly 24 may be configured to rotate throughout the folding range of motion shown by arrows 100. However, a clearance region 102 spaced from the hollow portion 46 may be substantially devoid of moving parts (e.g., row units 22, wheels 72). The clearance region 102 may surround the hollow portion 46 of the pull frame 14 that extends over the central tool bar 35. For example, the clearance region 102 may extend outwardly to approximately 1, 2, 3, 4, 5, 6, 10, or 12 inches from the hollow portion 46. While the clearance region 102 is shown as a cylinder, it may have any other geometry as it is defined by the space between the hollow portion 46 and the tool bar assembly 24. The hollow portion 46 of the pull frame 14 protects the conduits 40 from the moving parts. The hollow portion 46 of the pull frame 14 may also hide a portion of the conduits 40 from view, thereby streamlining the connection between the implement 10 and the work vehicle 13.

Figure 4:
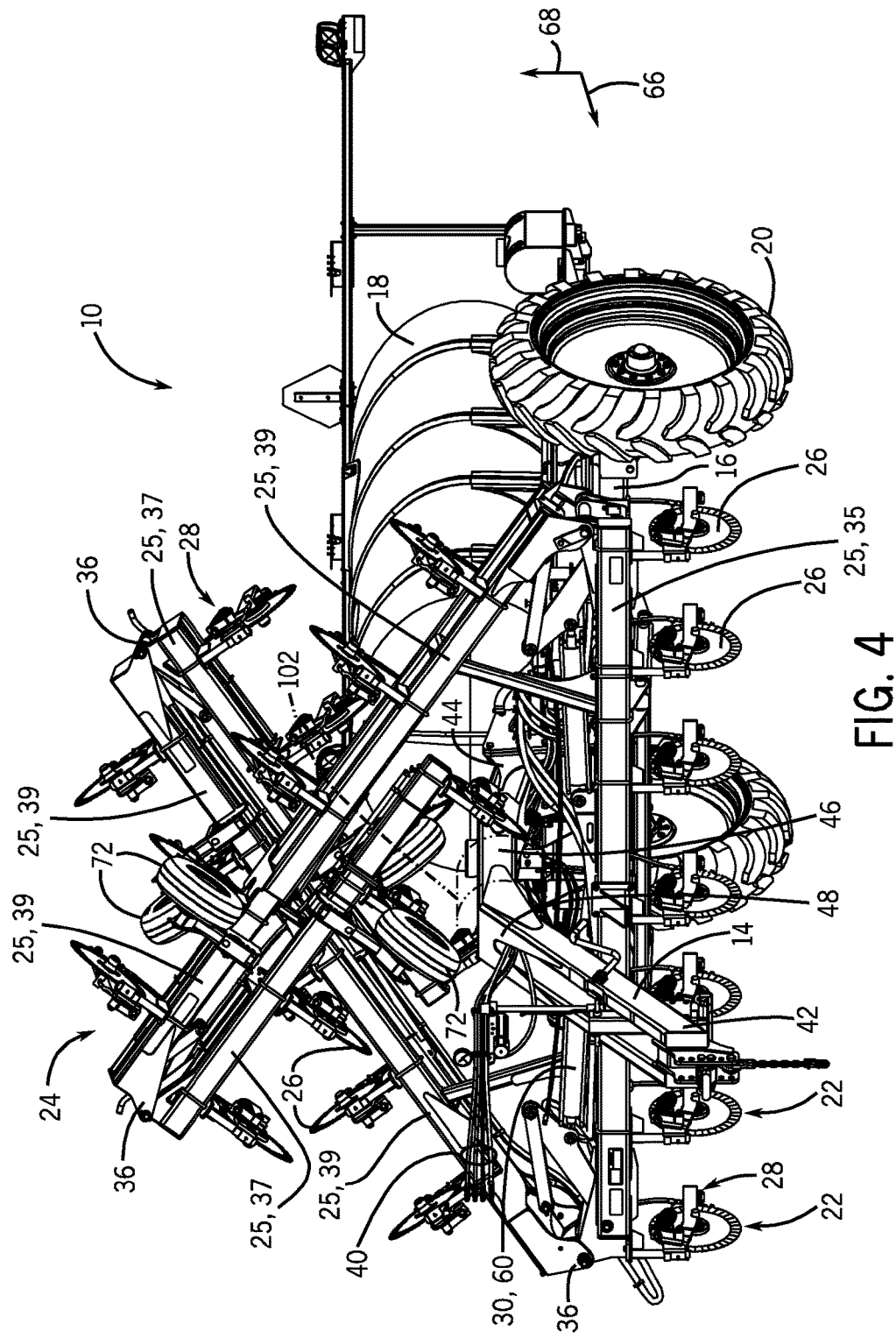
FIG. 4 is a perspective view of an embodiment of the agricultural implement of FIG. 1 having the tool bar assembly in a transport position.

FIG. 4 is a perspective view of the implement 10 of FIG. 1 in the folded configuration, such as for transport of the implement 10. Accordingly, the wing tool bars 37, 39 of the tool bar assembly 24 are folded at the joints 36 in an X-shape around the pull frame 14 such that the folded wing tool bars 37, 39 overlap each other in the longitudinal direction 66 over the pull frame 14. The pull frame 14 extends through the clearance region 102. The moving parts (e.g., row units 22, wheels 72) of the tool bar assembly 24 are positioned outside of the clearance region 102. As discussed above, the pull frame 14 may be coupled to the main frame 16 to enable a pull frame 14 with a different geometry to be removably coupled to the main frame 16. For example, an S-shaped pull frame 14 may accommodate a tool bar assembly 24 having a different folded configuration or differently shaped central tool bar 35.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
a tool bar assembly comprising a first tool bar, wherein the tool bar assembly is configured to couple to a main frame of the agricultural implement, and a height of the first tool bar is adjustable relative to a soil surface;
a pull frame comprising a hitch assembly, a mounting portion, a hollow portion, a hitch on an end of a downward sloping portion of the hitch assembly, a first port to the hollow portion on the downward sloping portion of the hitch assembly, and a second port to the hollow portion proximate to the mounting portion, wherein the first port is positioned above the hitch and closer to the tool bar assembly than the hitch, the hitch is configured to be coupled to a work vehicle, the mounting portion is configured to be removably coupled to the main frame of the agricultural implement, the hollow portion extends over the first tool bar between the first port and the second port while the tool bar assembly and the pull frame are coupled to the main frame, and the hollow portion is configured to accommodate one or more conduits; and
the one or more conduits extending through the hollow portion of the pull frame at least while the pull frame is coupled to the main frame, wherein each conduit of the one or more conduits is configured to convey a fluid, an electrical current, or any combination thereof, between the agricultural implement and the work vehicle.

2. The agricultural implement of claim 1, comprising a fluid controller and a first actuating cylinder coupled to the first tool bar, wherein the fluid controller is configured to control the first actuating cylinder to adjust the height of the first tool bar.

3. The agricultural implement of claim 2, wherein the fluid controller is configured to adjust a span of the tool bar assembly.

4. The agricultural implement of claim 2, comprising a second tool bar and a second actuating cylinder coupled to the second tool bar, wherein the fluid controller is configured to control the second actuating cylinder to adjust a position of the second tool bar relative to the first tool bar, wherein the hollow portion and the one or more conduits disposed therein are positioned to be spaced from the second tool bar throughout a folding range of motion of the second tool bar.

5. The agricultural implement of claim 1, wherein a first length of the tool bar assembly is less than a second length of the hollow portion.

6. The agricultural implement of claim 1, wherein the one or more conduits comprise a hydraulic line, an electrical line, a flowable agricultural product line, or any combination thereof.

7. The agricultural implement of claim 1, wherein the hollow portion extends over the first tool bar by a distance sufficient to accommodate a height range of motion of the first tool bar.

8. The agricultural implement of claim 1, wherein the tool bar assembly is removably coupled to the main frame of the agricultural implement, and the height of the tool bar assembly is adjustable relative to the main frame independently of the pull frame.

9. An agricultural implement, comprising:
a main frame configured to at least partially support the agricultural implement;
a tool bar assembly removably coupled to the main frame, wherein the tool bar assembly comprises a plurality of tool bars, and the plurality of tool bars is vertically adjustable relative to a soil surface;
a pull frame comprising a hitch assembly configured to be coupled to a work vehicle via a hitch positioned at an end of the hitch assembly, a mounting portion removably coupled to the main frame, a first port to a hollow portion of the pull frame on a downward sloping portion of the hitch assembly, a second port to the hollow portion of the pull frame proximate to the mounting portion, wherein the first port is positioned above the hitch and closer to the tool bar assembly than the hitch, the hollow portion extends over at least one tool bar of the plurality of tool bars between the first port and the second port, the hollow portion is configured to accommodate one or more conduits, and the hollow portion is positioned to be spaced from the plurality of tool bars throughout a cross-folding range of motion of the tool bar assembly, in which a portion of the tool bar assembly is positioned over the hollow portion while the tool bar assembly is in a cross-folded position; and
the one or more conduits extending through the hollow portion of the pull frame from the first port to the second port at least while the pull frame is coupled to the main frame, wherein each conduit of the one or more conduits is configured to convey a fluid, an electrical current, or any combination thereof, between the agricultural implement and the work vehicle.

10. The agricultural implement of claim 9, comprising a storage tank mounted on the main frame, wherein the storage tank is configured to hold a flowable agricultural product.

11. The agricultural implement of claim 9, wherein the tool bar assembly and the pull frame are independently removable from the main frame, and a height of the tool bar assembly is adjustable relative to the main frame independently of the pull frame.

12. The agricultural implement of claim 9, wherein the tool bar assembly comprises a plurality of row units configured to deliver a flowable agricultural product to a field, and the plurality of row units are disposed along the plurality of tool bars.

13. The agricultural implement of claim 9, comprising a fluid controller and a plurality of actuating cylinders coupled to the plurality of tool bars, wherein the fluid controller is configured to control the plurality of actuating cylinders to adjust the plurality of tool bars throughout the folding range of motion.

14. The agricultural implement of claim 13, wherein the fluid controller is configured to adjust the plurality of tool bars to a folded configuration at least partially surrounding the pull frame.

15. The agricultural implement of claim 9, wherein the one or more conduits comprise a hydraulic line, an electrical line, a flowable agricultural product line, or any combination thereof.

16. A method of manufacturing an agricultural implement, comprising:
  coupling a first tool bar assembly to a main frame, wherein a first height of the first tool bar assembly is adjustable relative to a soil surface;
  selecting a first pull frame based on a first range of motion of the first tool bar assembly, wherein the first range of motion comprises a first height range of motion, a first folding range of motion, or any combination thereof, and the first pull frame comprises a hitch assembly having a hitch at a first end of the hitch assembly;
  removably coupling the first pull frame to the main frame, wherein the first pull frame extends over at least a portion of the first tool bar assembly; and
  inserting one or more conduits through a first port of a first hollow portion of the first pull frame, wherein the first port is positioned above the hitch on a downward sloping surface of the first pull frame and closer to the tool bar assembly than the hitch, and the one or more conduits are configured to be coupled to a work vehicle and to the agricultural implement.

17. The method of claim 16, wherein the one or more conduits comprise a hydraulic line, an electrical line, a flowable agricultural product line, or any combination thereof.

18. The method of claim 16, comprising:
  removing the first tool bar assembly and the first pull frame from the main frame;
  removably coupling a second tool bar assembly to the main frame, wherein the second tool bar assembly is different than the first tool bar assembly, and a second height of the second tool bar assembly is adjustable relative to the soil surface;
  selecting a second pull frame based on a second range of motion of the second tool bar assembly, wherein the second pull frame is different than the first pull frame, and wherein the second range of motion comprises a second height range of motion different than the first height range of motion, a second folding range of motion different than the first folding range of motion, or any combination thereof; and
  removably coupling the second pull frame to the main frame, wherein the second pull frame extends over at least a portion of the second tool bar assembly.

19. The method of claim 18, comprising inserting the one or more conduits through a second hollow portion of the second pull frame.

20. The agricultural implement of claim 1, comprising a conduit support positioned above the hitch on the hitch assembly, wherein the conduit support is configured to direct the one or more conduits toward the first port.

* * * * *